(12) United States Patent
Diaz et al.

(10) Patent No.: US 8,381,813 B2
(45) Date of Patent: Feb. 26, 2013

(54) METHODS FOR SERVICING SUBTERRANEAN WELLS

(75) Inventors: Nelson Diaz, Chatou (FR); Jesse Lee, Paris (FR); Stéphane Boulard, Le Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 297 days.

(21) Appl. No.: 12/872,320

(22) Filed: Aug. 31, 2010

(65) Prior Publication Data

US 2011/0048720 A1 Mar. 3, 2011

(51) Int. Cl.
  *E21B 21/00* (2006.01)
  *E21B 33/138* (2006.01)
  *C09K 8/92* (2006.01)
  *C09K 8/94* (2006.01)

(52) U.S. Cl. ........ 166/286; 166/292; 166/294; 166/295; 166/376; 175/72; 507/219; 523/130

(58) Field of Classification Search .................. None
See application file for complete search history.

(56) References Cited

U.S. PATENT DOCUMENTS

| | | | | |
|---|---|---|---|---|
| 2,861,636 | A * | 11/1958 | Messenger | 166/292 |
| 2,935,472 | A | 3/1960 | Klaas et al. | |
| 3,150,726 | A * | 9/1964 | Bodine | 175/72 |
| 3,722,591 | A | 3/1973 | Maxson | |
| 4,191,254 | A * | 3/1980 | Baughman et al. | 166/286 |
| 4,526,240 | A * | 7/1985 | McKinley et al. | 175/72 |
| 5,476,543 | A | 12/1995 | Ryan | |
| 7,077,198 | B2 | 7/2006 | Vinegar et al. | |
| 7,441,599 | B2 | 10/2008 | Hermes et al. | |
| 2003/0234102 | A1 * | 12/2003 | Brothers et al. | 166/293 |
| 2005/0167104 | A1 | 8/2005 | Roddy et al. | |
| 2006/0086501 | A1 | 4/2006 | Creel et al. | |
| 2007/0114033 | A1 | 5/2007 | Hermes et al. | |
| 2009/0084604 | A1 * | 4/2009 | Polizzotti et al. | 175/65 |
| 2010/0314111 | A1 * | 12/2010 | Karcher et al. | 166/293 |

FOREIGN PATENT DOCUMENTS

| | | |
|---|---|---|
| EP | 0197609 | 2/1992 |
| WO | 2008077499 | 7/2008 |
| WO | 2009/045656 | 4/2009 |

OTHER PUBLICATIONS

Daccord G, Craster B, Ladva H, Jones TGJ and Manescu G: "Cement-Formation Interactions," in Nelson EB and Guillot D (eds.): Well Cementing-2nd Edition, Houston: Schlumberger (2006): 202-219.

* cited by examiner

*Primary Examiner* — George Suchfield
(74) *Attorney, Agent, or Firm* — Matthias Abrell

(57) ABSTRACT

Methods for controlling lost circulation in subterranean wells, and in particular, fluid compositions and methods for operations during which the fluid compositions are pumped into a wellbore, enter voids in the subterranean-well formation through which wellbore fluids escape, and form a seal that limits further egress of wellbore fluid from the wellbore. The methods include preparing a carrier fluid containing compressed expandable foam that may be encapsulated. The carrier fluid is then placed into a lost-circulation zone, whereupon the foam expands to form a barrier that minimizes or blocks further ingress of carrier fluid. Lost-circulation control may be supplemented by introducing additional lost-circulation materials, pumping a cement slurry behind the foam-containing carrier fluid or both.

19 Claims, 2 Drawing Sheets

METHODS FOR SERVICING SUBTERRANEAN WELLS

BACKGROUND OF THE INVENTION

The statements in this section merely provide background information related to the present disclosure and may not constitute prior art.

This invention relates to methods for controlling lost circulation in subterranean wells, in particular, fluid compositions and methods for operations during which the fluid compositions are pumped into a wellbore, enter voids in the subterranean-well formation through which wellbore fluids escape, and form a seal that limits further egress of wellbore fluid from the wellbore.

During construction of a subterranean well, drilling and cementing operations are performed that involve circulating fluids in and out of the well. The fluids exert hydrostatic and pumping pressure against the subterranean rock formations, and may induce a condition known as lost circulation. Lost circulation is the total or partial loss of drilling fluids or cement slurries into highly permeable zones, cavernous formations and fractures or voids. Such openings may be naturally occurring or induced by pressure exerted during pumping operations. Lost circulation should not be confused with fluid loss, which is a filtration process wherein the liquid phase of a drilling fluid or cement slurry escapes into the formation, leaving the solid components behind.

Lost circulation can be an expensive and time consuming problem. During drilling, this loss may vary from a gradual lowering of the mud level in the pits to a complete loss of returns. Lost circulation may also pose a safety hazard, leading to well-control problems and environmental incidents. During cementing, lost circulation may severely compromise the quality of the cement job, reducing annular coverage, leaving casing exposed to corrosive downhole fluids, and failing to provide adequate zonal isolation. Lost circulation may also be a problem encountered during well-completion and workover operations, potentially causing formation damage, lost reserves and even loss of the well.

Lost-circulation solutions may be classified into three principal categories: bridging agents, surface-mixed systems and downhole-mixed systems. Bridging agents, also known as lost-circulation materials (LCMs), are solids of various sizes and shapes (e.g., granular, lamellar, fibrous and mixtures thereof). They are generally chosen according to the size of the voids or cracks in the subterranean formation (if known) and, as fluid escapes into the formation, congregate and form a barrier that minimizes or stops further fluid flow. Surface-mixed systems are generally fluids composed of a hydraulic cement slurry or a polymer solution that enters voids in the subterranean formation, sets or thickens, and forms a seal that minimizes or stops further fluid flow. Downhole-mixed systems generally consist of two or more fluids that, upon making contact in the wellbore or the lost-circulation zone, form a viscous plug or a precipitate that seals the zone.

A thorough overview of LCMs, surface-mixed systems and downhole-mixed systems, including guidelines for choosing the appropriate solution for a given situation, is presented in the following reference: Daccord G, Craster B, Ladva H, Jones T G J and Manescu G: "Cement-Formation Interactions," in Nelson E and Guillot D (eds.): *Well Cementing—$2^{nd}$ Edition*, Houston: Schlumberger (2006): 202-219.

Swellable materials may be employed as bridging agents, either alone or in a mixture of different bridging agents. The swellable materials increase in size and/or form gels upon mixing with aqueous or hydrocarbon-base fluids, depending on their chemistries. For example, this concept was described by Klaas et al. in U.S. Pat. No. 2,935,472 and, more recently, by Creel et al. in U.S. Patent Application 2006/0086501 A1. Broad varieties of swellable polymers that are suitable for curing lost circulation are revealed by McKinley et al. in U.S. Pat. No. 4,526,240.

Swellable polymers suffer from a fundamental problem in that their ability to swell is limited by the presence of soluble salts in the carrier fluid that increase ionic strength. For example, exposing swellable polymers to formation waters that contain high concentrations of electrolytes (e.g., $Na^+$ and $Ca^{2+}$) severely limits the degree to which swelling occurs, and reduces the polymers' ability to address lost circulation. Therefore, there is a need for a swellable-polymer system that is relatively independent of fluid chemistry, and may swell or expand under a broad range of downhole conditions.

SUMMARY

Some embodiments provide methods and techniques to seal voids and cracks in subterranean-formation rock, thereby minimizing or stopping fluid flow between the formation rock and the wellbore of a subterranean well.

In a first aspect, embodiments are methods of treating a subterranean well with the aim of sealing voids that cause lost circulation in formations. The methods include preparing a carrier fluid containing compressed expandable foam. The carrier-fluid may be placed into a subterranean lost-circulation zone by various methods, including, but not limited to (1) pumping through tubulars (e.g., drill pipe, coiled tubing and casing); (2) pumping in the annulus between tubulars and the subterranean-formation wall; and (3) transporting the carrier fluid inside a dispensing device (e.g., a dump bailer), lowering the device to the lost-circulation zone and releasing the fluid. As the carrier fluid enters the lost-circulation zone, the foam expands and forms a barrier that minimizes or blocks further fluid flow into the lost-circulation zone.

The foam composition may include polyurethane, polyether, polyester, polyimide, naturally occurring sponge, melamine and mixtures thereof. The uncompressed foam density preferably ranges between about 0.01 $g/cm^3$ and 0.3 $g/cm^3$, most preferably between 0.015 $g/cm^3$ and 0.2 $g/cm^3$. The foam compression may be such that the compressed-foam volume is about 3 to 30 times lower than the uncompressed-foam volume.

Dissolvable polymers may also be imbibed into the compressed foam to help control when and where foam expansion occurs in the well. Such polymers include, but are not limited to, polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, copolymers of ethylene and vinyl acetate, and mixtures thereof.

The foam-containing carrier fluid may be supplemented by the addition of one or more lost-circulation materials having various shapes such as particles, flakes, or fibers and combinations thereof. In addition, a separate carrier fluid containing the aforementioned lost-circulation materials may be placed behind the foam-containing carrier fluid. Additionally, further reinforcement of the barrier may be achieved by placing a cement slurry across the lost-circulation zone.

In further aspects, embodiments are methods of treating a subterranean well with the aim of sealing voids in formations that cause lost circulation. The methods include preparing a carrier fluid that contains encapsulated compressed foam. The carrier-fluid containing the foam capsules may be placed into a subterranean lost-circulation zone by various methods, including, but not limited to (1) pumping through tubulars (e.g., drill pipe, coiled tubing and casing); (2) pumping in the annulus between tubulars and the subterranean-formation wall; and (3) transporting the carrier fluid inside a dispensing device (e.g., a dump bailer), lowering the device to the lost-circulation zone and releasing the fluid. As the carrier fluid enters a lost-circulation zone, the capsule coating dissolves and releases the compressed foam. The compressed foam then expands to its original size, forming a barrier that minimizes or blocks further flow of carrier fluid into the lost-circulation zone.

The foam composition may include polyurethane, polyether, polyester, polyimide, naturally occurring sponge, melamine and mixtures thereof. The capsule may be fabricated from dissolvable polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, copolymers of ethylene and vinyl acetate, and mixtures thereof.

The capsule coating may include one or more dissolvable polymers selected from the list comprising polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, and copolymers of ethylene and vinyl acetate.

The capsule length may vary from about 0.5 cm to 10 cm, preferably between about 1 cm to 5 cm. The capsule diameter may vary from about 1 mm to 30 mm, preferably between about 5 mm to 20 mm. The volume ratio between the coating and the compressed foam (coating:compressed foam) may vary between about 5:95 to 80:20, preferably between about 10:90 to 60:40, even more preferably about 50:50.

Dissolvable polymers may also be imbibed into the compressed foam to help control when and where foam expansion occurs in the well. Such polymers include, but are not limited to, polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, copolymers of ethylene and vinyl acetate, and mixtures thereof.

The encapsulated-foam-containing carrier fluid may be supplemented by the addition of one or more lost-circulation materials such as particles, flakes, or fibers and mixtures thereof. In addition a separate carrier fluid containing the aforementioned lost-circulation materials may be placed behind the foam-containing carrier fluid. Further reinforcement of the barrier may be achieved by placing a cement slurry across the lost-circulation zone.

DETAILED DESCRIPTION

Figure 1:
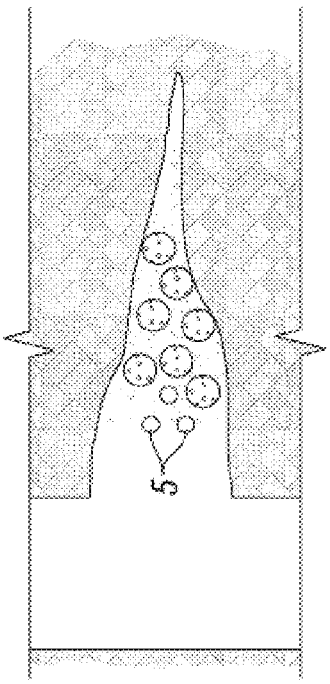
FIG. 1 shows carrier fluid containing particles of encapsulated compressed expandable foam, entering a lost-circulation zone.
Figure 2:
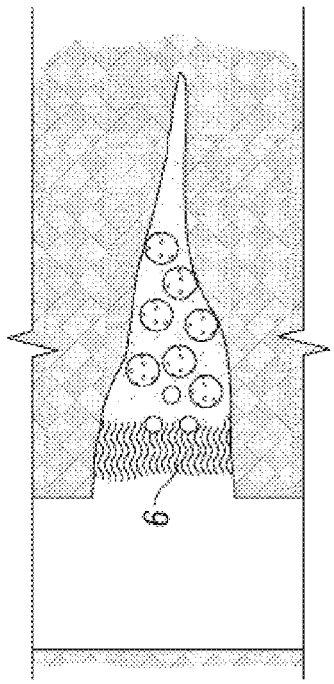
FIG. 2 shows the foam expanding in the lost-circulation zone after the capsules degrade, forming a barrier that obstructs further fluid flow.
Figure 3:
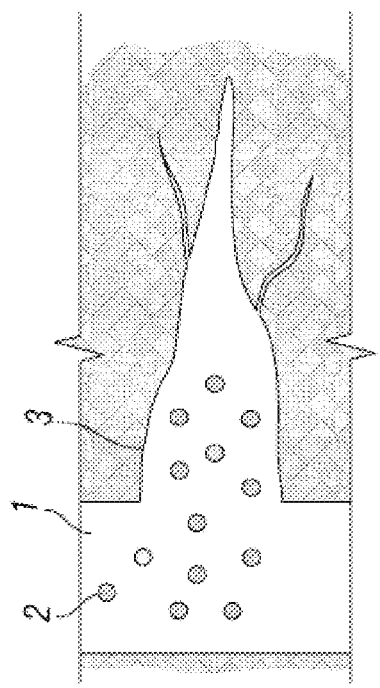
FIG. 3 shows the introduction of additional reinforcing carrier fluid containing lost-circulation materials.
Figure 4:
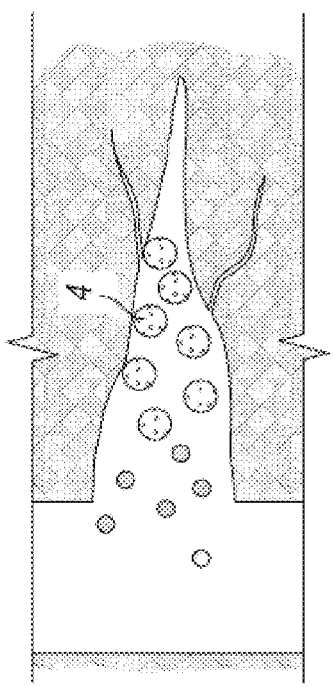
FIG. 4 shows further reinforcement of the flow barrier in the lost-circulation zone by a cement system.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

We have discovered that carrier fluids comprising particles of compressed expandable foam have the ability to limit fluid flow in passageways of a size consistent with many lost-circulation zones in subterranean wells. This discovery has led to the development of methods by which such fluids may be applied to solving lost-circulation problems.

A first aspect is methods of treating a subterranean well with the aim of sealing voids in formations that cause lost circulation. The method comprises preparing a carrier fluid containing compressed expandable foam. The carrier-fluid may be placed into a subterranean lost-circulation zone by various methods, including, but not limited to (1) pumping through tubulars (e.g., drill pipe, coiled tubing and casing); (2) pumping in the annulus between tubulars and the subterranean-formation wall; and (3) transporting the carrier fluid inside a dispensing device (e.g., a dump bailer), lowering the device to the lost-circulation zone and releasing the fluid. As the carrier fluid enters the lost-circulation zone, the foam expands and forms a barrier that minimizes or blocks further fluid flow into the lost-circulation zone.

In the present context, the carrier fluid may be selected from common types of oilfield service fluids that are chemically compatible with the coating materials. For example, fluids viscosified by polymers, bentonite, or surfactants. Specific examples are spacers, water-based muds, linear or crosslinked fracturing fluids, or lost circulation pills. In terms of compatibility, obvious incompatibility needs to be avoided, e.g. Polyvinylalcohol type of coating materials are known to be incompatible with certain types of crosslinkers such as borate or zirconate for fracturing fluids.

The foam composition may comprise polyurethane, polyether, polyester, polyimide, naturally occurring sponge, melamine and mixtures thereof. The uncompressed foam density may range between about 0.01 g/cm$^3$ and 0.3 g/cm$^3$, most preferably between 0.015 g/cm$^3$ and 0.2 g/cm$^3$. The foam compression may be such that the compressed-foam volume is about 3 to 30 times lower than the uncompressed-foam volume.

Dissolvable polymers may also be imbibed into the compressed foam to help control when and where foam expansion occurs in the well. Such polymers include, but are not limited to, polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, copolymers of ethylene and vinyl acetate, and mixtures thereof.

The foam-containing carrier fluid may be supplemented by the addition of one or more lost-circulation materials such as, for example, fibrous (cedar bark, shredded cane stalks, mineral fiber and hair), flaky (mica flakes and pieces of plastic or cellophane sheeting) or granular (ground and sized limestone or marble, wood, nut hulls, Formica, corncobs and cotton hulls) and combinations thereof. In addition, a separate carrier fluid containing the aforementioned lost-circulation materials may be placed behind the foam-containing carrier fluid. Further reinforcement of the barrier may be achieved by placing a cement slurry across the lost-circulation zone.

The second aspect, illustrated in FIGS. 1-4, includes treating a subterranean well (1) with the aim of sealing voids in formations that cause lost circulation. The method includes preparing a carrier fluid that contains encapsulated compressed foam (2). As the carrier fluid containing compressed-foam capsules enters a lost-circulation zone (3), the capsule coating dissolves and releases the compressed foam. The compressed foam then expands to its original size (4), forming a barrier that minimizes or blocks further flow of carrier fluid into the formation. Without wishing to be bound by any theory, the inventors believe that during placement, the temperature of the carrier fluid does not equalize the bottom hole static temperature due to cool down effect; however, once bridged inside the fracture, the coating experiences the increasing temperature downhole and thus the kinetic of reaction is increase allowing a degradation of the coating and thus the release of the expandable foam.

The carrier-fluid containing the foam capsules may be placed into a subterranean lost-circulation zone by various methods, including, but not limited to (1) pumping through tubulars (e.g., drill pipe, coiled tubing and casing); (2) pumping in the annulus between tubulars and the subterranean-formation wall; and (3) transporting the carrier fluid inside a dispensing device (e.g., a dump bailer), lowering the device to the lost-circulation zone and releasing the fluid.

The foam composition may include polyurethane, polyether, polyester, polyimide, naturally occurring sponge, melamine and mixtures thereof. The capsule may be fabricated from dissolvable polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, copolymers of ethylene and vinyl acetate, and mixtures thereof.

The capsule coating may include one or more dissolvable polymers selected from the list comprising polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, and copolymers of ethylene and vinyl acetate.

The capsule length may vary from about 0.5 cm to 10 cm, preferably between about 1 cm to 5 cm. The capsule diameter may vary from about 1 mm to 30 mm, preferably between about 5 mm to 20 mm. The volume ratio between the coating and the compressed foam (coating:compressed foam) may vary between about 5:95 to 80:20, preferably between about 10:90 to 50:50.

Dissolvable polymers may also be imbibed into the compressed foam to help control when and where foam expansion occurs in the well. Such polymers include, but are not limited to, polyvinylalcohol, partially saponified polyvinylalcohol, polyvinylpyrrolidone, methylcellulose, cellulose acetate, carboxymethylcelluose, hydroxyethylcellulose, polyethylene oxide, gelatin, dextrin, agar, pectin, polyvinylacetate, copolymers of ethylene and vinyl acetate, and mixtures thereof.

The encapsulated-foam-containing carrier fluid may be supplemented by the addition of one or more lost-circulation materials such as particles, flakes, fibers and mixtures thereof. Such addition may further help the lost circulation control. In addition, a separate carrier fluid containing the aforementioned lost-circulation materials (5) may be placed behind the foam-containing carrier fluid. Further reinforcement of the barrier may be achieved by placing a cement slurry (6) across the lost-circulation zone.

EXAMPLES

The following example serves to further illustrate the invention.

Example 1

A plugging test was performed in a flow line equipped with a 6 mm×20 mm slot that simulated the opening of a lost-circulation zone. Encapsulated open-cell polyurethane foam was purchased from Westminster Toys, Inc., 159 Armour Drive, Atlanta, Ga., USA 30324. The product name was "Magic Capsules." The capsule dimensions were: 1 cm long and 30 mm diameter. The dimensions of the uncompressed polyurethane foam were 2 cm×2 cm×0.5 cm, and the foam density was 0.032 g/cm$^3$ before compression. The foam was compressed 30 times by volume inside the capsules. The capsules were fabricated from water-soluble polyvinylalcohol (molecular weight: 14,000-40,000; degree of hydrolysis: 80-90 percent).

Figure 5:
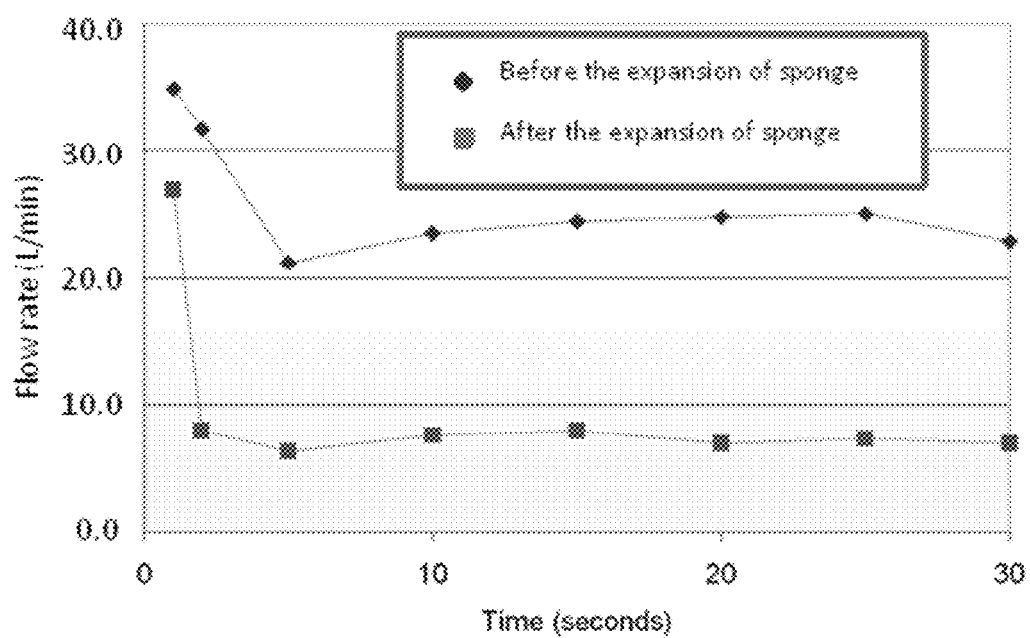
FIG. 5 shows the results of flow-rate tests that demonstrate the feasibility of encapsulated compressed foam as a lost-circulation material.

A 10-L reservoir was filled with water and raised to a height of 2 m. The flow line was connected such that the slot was 0.5 m from the ground. The flow rate through the slot was measured with plain water at 40° C. to establish a baseline. Next, one capsule was added. The capsule degraded, and the volume of the compressed foam increased fivefold. After expansion the flow rate through the slot was measured. The results, shown in FIG. 5, reveal that the flow rate decreased by a factor of three. This result demonstrates the feasibility of using expandable foam for curing lost circulation arising from formation voids.

We claim:
1. A method of controlling lost circulation in a subterranean well, comprising:
    i. preparing a carrier fluid comprising compressed expandable foam, wherein a dissolvable polymer composition comprising polyvinylalcohol is imbibed into the compressed foam;

ii. placing the carrier fluid containing the compressed foam into a subterranean lost-circulation zone; and
iii. allowing the foam to expand and form a barrier that limits further ingress of carrier fluid.

2. The method of claim 1, wherein the foam comprises a composition selected from the list consisting of polyurethane, polyester, polyimide and melamine.

3. The method of claim 1, wherein the carrier fluid further comprises one or more lost-circulation materials selected from the list consisting of particles, flakes and fibers.

4. The method of claim 1, further comprising placing a carrier fluid containing one or more lost-circulation materials selected from the list consisting of particles, flakes and fibers behind the foam-containing carrier fluid.

5. The method of claim 4, further comprising placing a cement slurry into the lost-circulation zone.

6. The method of claim 1, further comprising placing a cement slurry into the lost-circulation zone.

7. The method of claim 1, wherein the fluid is pumped into the well through the interior of one or more tubulars selected from the list consisting of drill pipe, coiled tubing and casing.

8. The method of claim 1, wherein the fluid is pumped into the well through the annulus between tubulars and the subterranean formation.

9. The method of claim 1, wherein the fluid is placed inside a device that is lowered into the well, and dispensed across lost-circulation zones.

10. A method of controlling lost circulation in a subterranean well, comprising:
   i. preparing a carrier fluid containing expandable foam compressed inside a capsule;
   ii. placing the carrier fluid containing the capsules into a subterranean lost-circulation zone;
   iii. allowing the capsule coating to degrade, releasing the foam into the carrier fluid; and
   iv. allowing the foam to expand and form a barrier that limits further ingress of carrier fluid.

11. The method of claim 10, wherein the foam comprises a composition selected from the list consisting of polyurethane, polyester, polyimide and melamine.

12. The method of claim 10, wherein the capsule comprises polyvinylalcohol.

13. The method of claim 10, further comprising placing one or more lost-circulation materials selected from the list consisting of particles, flakes and fibers behind the foam-containing carrier fluid.

14. The method of claim 13, further comprising placing a cement slurry into the lost-circulation zone.

15. The method of claim 10, further comprising placing a cement slurry into the lost-circulation zone.

16. The method of claim 10, wherein the fluid is pumped into the well through the interior of one or more tubulars selected from the list consisting of drill pipe, coiled tubing and casing.

17. The method of claim 10, wherein the fluid is pumped into the well through the annulus between tubulars and the subterranean formation.

18. The method of claim 10, wherein the fluid is placed inside a device that is lowered into the well, and wherein the fluids are dispensed across lost-circulation zones.

19. A method of controlling lost circulation in a subterranean well, comprising:
   i. preparing a carrier fluid containing expandable foam compressed inside a capsule having a length of from 0.5 to 10 cm;
   ii. placing the carrier fluid containing the capsules into a subterranean lost-circulation zone; and
   iii. allowing the capsule to enter such subterranean lost circulation zone; and
   iv. allowing the coating to be degraded upon increase of temperature downhole thus releasing the foam and while expanding form a barrier that limits further ingress of carrier fluid.

* * * * *